United States Patent [19]
Bokovoy

[11] 3,743,067
[45] July 3, 1973

[54] REVERSIBLE OVERRUNNING CLUTCH WITH AUTOMATIC SHIFT CONTROL

[75] Inventor: Ronald D. Bokovoy, Bloomfield Hills, Mich.

[73] Assignee: Boise Cascade Corporation, Boise, Idaho

[22] Filed: Dec. 2, 1971

[21] Appl. No.: 204,117

[52] U.S. Cl............... 192/43, 192/46, 192/48.91, 192/48.92, 192/67 A, 192/94, 192/108
[51] Int. Cl. ... F16d 41/00, F16d 11/04, F16d 23/08
[58] Field of Search.............. 192/43, 46, 48.91, 192/48.92, 67 A, 94, 108

[56] References Cited
UNITED STATES PATENTS

| 3,651,907 | 3/1972 | Myers, Sr.............................. | 192/43 |
| 2,797,783 | 7/1957 | Lee et al............................... | 192/43 |
| 3,200,919 | 8/1965 | Lanigan et al........................ | 192/43 |

*Primary Examiner*—Allan D. Herrman
*Attorney*—Lawrence E. Laubscher

[57] ABSTRACT

An improved reversible overrunning clutch of the type including a central driver member that is axially shiftable by helical spline means between clutch engaged positions relative to axially spaced forward and reverse clutch members mounted on an output shaft. The invention is characterized by the provision of automatic shift control means operable in accordance with the direction of rotation of the rotary input drive means to shift the central driver member toward a readiness position immediately adjacent the appropriate clutch member, thereby insuring the correct directional operation of the unit.

8 Claims, 21 Drawing Figures

PATENTED JUL 3 1973 3,743,067

INVENTOR.
Ronald D. Bokovoy
BY
Lawrence E. Laubscher
ATTORNEY

INVENTOR.
Ronald D. Bokovoy
BY
Lawrence E. Laubscher
ATTORNEY

INVENTOR.
Ronald D. Bokovoy
BY
Lawrence E. Laubscher
ATTORNEY

INVENTOR.
Ronald D. Bokovoy
BY
Lawrence E. Laubscher
ATTORNEY

INVENTOR.
Ronald D. Bokovoy
BY
Lawrence E. Laubscher
ATTORNEY

REVERSIBLE OVERRUNNING CLUTCH WITH AUTOMATIC SHIFT CONTROL

In the prior U. S. Pat. application of Albert F. Myers, Sr., Ser. No. 60,386 filed Aug. 3, 1970, which issued on Mar. 28, 1972 as U. S. Letters Pat. No. 3,651,907, an overrunning clutch for a transfer case transmission is disclosed in which a central driver member is axially shifted by helical spline means into clutching engagement with the appropriate one of spaced forward and reverse clutch members mounted on an output shaft. Holdout ring means are provided that are operable when the speed of rotation of a driven shaft is greater than that of a driving shaft for maintaining the central driver member in an intermediate disengaged position relative to said forward and reverse clutch members. While the prior reversible overrunning clutch construction affords satisfactory operation and special utility in the transfer case mechanism of a motor vehicle having front and rear axle drive, it has been proposed, in accordance with the present invention, to simplify and reduce the cost of the prior construction by reducing the number of operating components thereof and to increase the reliability and speed of operation by causing the central driver member, when in an overrunning disengaged condition, to be axially shifted toward a readiness position immediately adjacent the appropriate clutch member.

Accordingly, the primary object of the present invention is to provide an improved reversible overrunning clutch mechanism that includes automatic shift control means for positioning a central driver member axially toward a readiness position relative to the appropriate one of spaced forward and reverse clutch members. Consequently, during normal operation of the overrunning clutch means — when the front drive axle of the motor vehicle overruns the rear axle by a predetermined desired amount (on the order of 3 to 6 percent) — the central driver member is shifted toward the appropriate readiness position in accordance with the direction of rotation of the rotary input drive means. Consequently, when the rear wheels momentarily lose traction and it is desired to transfer drive torque to the overrunning front axle, the thrust imparted to the central driver via the helical spline teeth that connects the driving and central driver members is sufficient to displace axially the central driver member from the readiness position to the immediately adjacent clutch engaged position.

According to a more specific object of the invention the automatic shift control means is operable in response to the direction of rotation of the input drive means without requiring an external rotation change. To this end, the automatic shift control means includes an annular shift control cam member secured at one end to or part of the housing in which the output shaft of the clutch is journalled, and an annular shift control member arranged colinearly at the other end of said cam member, said cam and shift control members being resiliently biased together and provided at adjacent ends with cooperating overrunning cam teeth. Holdout ring means are provided for maintaining the shift control member in a first enabling position relative to one of said forward and reverse clutch members, said central driver member being connected with said shift control member for limited axial displacement between a retracted readiness position and an extended clutch engaging position. Upon rotation of the driving member in the opposite direction, the holdout ring means is released and the engagement of the cam teeth causes the shift control member to be axially displaced toward a second enabling position relative to the other clutch member. Friction drag means normally retard axial displacement of the central driver during corresponding displacement of the shift control member, thereby assuring that the central driver is normally in the retracted readiness position relative to the shift central member and the appropriate clutch member.

As a consequence of the improved construction afforded by the present invention, the engaging thrust force imparted to the central driver through the helical spline teeth is a function of the relative overrunning speed, not absolute speed. This reduces the rotational speed acting on the friction means from 100 percent to the percent of overrun between the front and rear axles, thereby considerably increasing durability. Another advantage of the improved construction is that when overrunning, the thrust direction of the central driver is self-disengaging whereby the need for holdout rings in the reversible clutch section of the apparatus is eliminated. A further advantage resides in the provision of a positive mechanical stop mechanism to prevent engagement in the retard mode in place of the calibrated friction means formally required, thereby considerably increasing reliability of operation. Finally, the improvement of the present invention is equally suitable for use either within an existing transfer case housing or as an externally mounted unit.

Other objects and advantages of the present invention will become apparent from a study of the following specification when viewed in the light of the accompanying drawing, in which:

Figure 1:
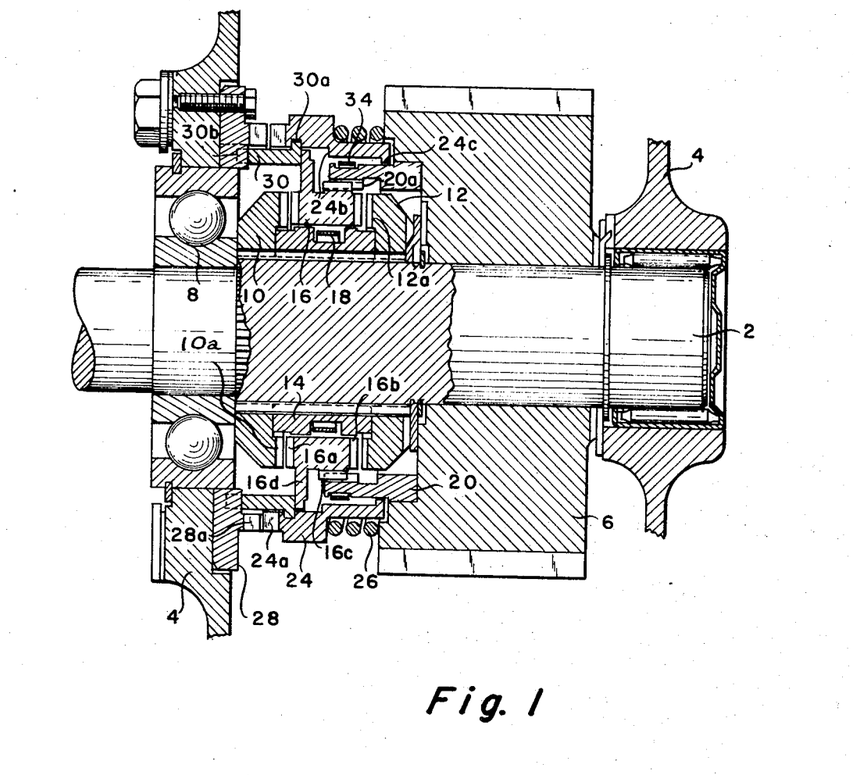
FIG. 1 is a longitudinal sectional view of a first embodiment of the reversible overrunning clutch means of the present invention.
Figure 13:
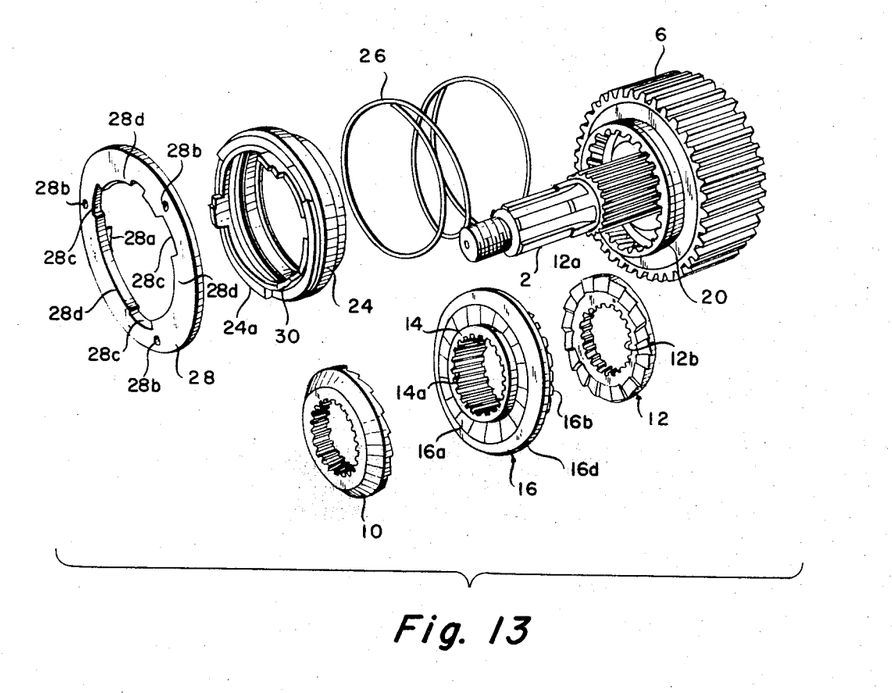
FIG. 13 is an exploded view of the reversible overrunning clutch means of FIG. 1.

Referring first more particularly to FIGS. 1 and 13, a first embodiment of the reversible overrunning clutch means is disclosed that is adapted for mounting in the existing transfer case housing of a motor vehicle having front and rear axle drive. The reversible overrunning clutch means includes an output shaft 2 that is journalled in a housing 4 for connection with the front axle of the vehicle, and an input or driving pinion 6 that is rotatably mounted on the output shaft, said driving pinion being adapted for connection with the rear axle of the vehicle. The forward drive axle is intentionally caused to normally overrun the rear axle by a slight amount (on the order of 3 to 6 percent) by conventional means (such as by incorporating a higher numerical ring and pinion ratio in the front axle, by adjusting front and rear tire size or inflation pressures, or by internal transfer case gear reduction). Mounted on the output shaft 2 between the driving pinion 6 and the roller bearing means 8 are reversible overrunning clutch means including axially spaced reverse and forward clutch members 10 and 12, respectively, that abut opposite ends of the spacer member 14, said clutch and spacer members being splined to said output shaft for rotation therewith. Mounted for axial sliding movement between and spaced from the opposed faces of the clutch members 10 and 12 is a central driver member 16, said central driver member having at each end clutch teeth 16a, 16b of the overrunning self-disengaging type arranged for alternate clutch engagement with corresponding clutch teeth 10a and 12a carried by the respective clutch members 10 and 12, respectively. A friction drag spring 18 is arranged concentrically intermediate the spacer 14 and the central driver 16 for establishing frictional drag therebetween.

Secured at one end with the driving pinion 6 and extending concentrically about the adjacent end of the central driver member 16 is an annular driving hub member 20, said hub member being provided on its inner periphery with helical spline teeth 20a that are adapted to engage corresponding helical spline teeth 16c provided on the outer periphery of the central driver member 16. In the illustrated embodiment, the cooperating helical spline teeth have a helix angle of 30°, whereby when the speed of rotation of the output shaft falls below a given value relative to the speed of rotation of the driving pinion (i.e., when the front axle fails to overrun the rear axle by the predetermined slight amount), the central driver is axially shifted in a direction corresponding with the direction of rotation of the driving pinion 6.

In accordance with the present invention, automatic shift control means are provided for mechanically shifting the central driver member 16 to a readiness position adjacent the appropriate clutch member, thereby to insure the correct directional operation of the reversible overrunning clutch means. To this end, there is arranged concentrically about the central driver member 16 an axially shiftable annular shift control member 24 that is biased to the left in FIG. 1 by the resilient compression spring 26 into contact with the stationary control shift cam member 28 that is secured to the housing. The adjacent faces of the shift control member 24 and the shift control cam member 28 are provided with cooperating direction-responsive cam teeth 24a and 28a, respectively, that axially displace the shift control member 24 to the right only for one given direction of rotation of the driving pinion. Rotatably connected at one end with the internal periphery of the shift control member 24 is a holdout ring 30, said holdout ring having an external circular flange 30a that extends within a corresponding groove contained in the inner periphery of the shift control member, whereby said shift control member and said holdout ring are axially shiftable as a unit. As will be explained in greater detail below with reference to FIGS. 7, 8 and 10–12, the holdout ring is provided at its other end with axial projections 30b that are adapted to releasably engage corresponding shoulder means carried by the shift control cam member 28, thereby maintaining the shift control member 24 in a first enabled position relative to the forward clutch member 12. Upon release of the holdout ring from the stationary shift control cam member 28 during rotation of the driving pinion 6 in the opposite direction, the shift control member is shifted to the left by the resilient spring 26 and by engagement of the cam teeth toward a second enabling position relative to the reverse clutch member 10.

In accordance with the present invention, the central driver member 16 is connected for limited axial displacement between retracted and extended positions relative to the shift control member 24. To this end, the central driver member is provided with an external flange 16d that extends radially outwardly into the axial space defined between the end of holdout ring 30 and the internal shoulder 24b provided on the inner periphery of the shift control member 24. Arranged concentrically between the spacer 14 and the central driver 16 is a friction drag spring 18 that resists axial movement of the central driver relative to the spacer. Consequently, when shift control member 24 is shifted to the right by the camming operation of teeth 28a and 24a toward the first enabling position relative to the forward clutch member 12, flange 16d is engaged by the end surface of holdout ring 30 to place the central driver in a disengaged retracted readiness position adjacent the forward clutch member. On the other hand, when shift control member 24 is shifted to the left by the spring 26 toward the second enabling position relative to the reverse clutch member 10, the flange 16d is engaged by the internal shoulder 24b to displace the central driver 16 toward a disengaged retracted readiness position adjacent the reverse clutch member 10.

Figure 2:
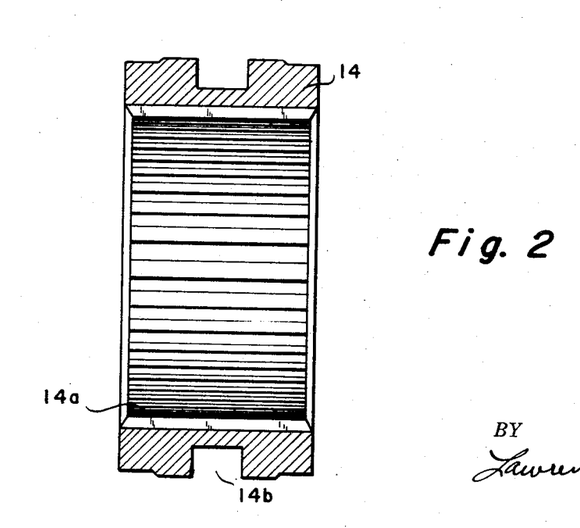
FIG. 2 is a longitudinal sectional view of the spacer element of the apparatus of FIG. 1.
Figure 3:
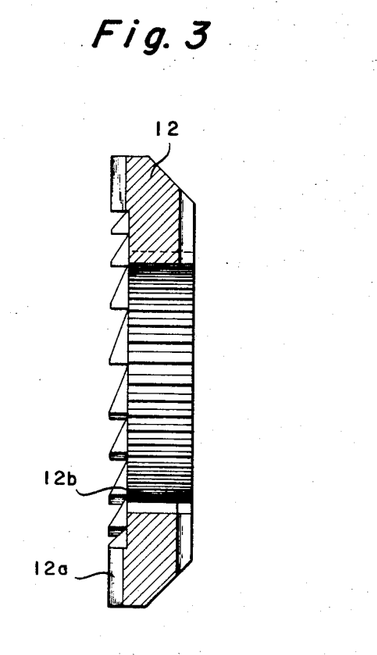
FIG. 3 is a longitudinal sectional view of one of the clutch elements of FIG. 1.
Figure 4:
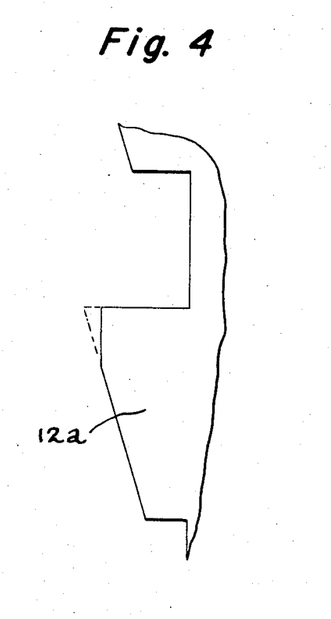
FIG. 4 is a detailed view of the self-disengaging overrunning tooth configuration of the clutch element of FIG. 3.
Figure 6:
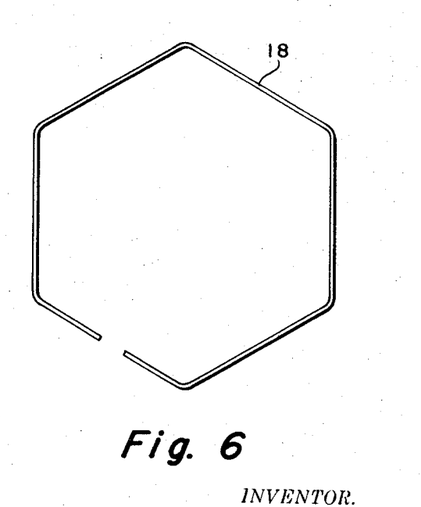
FIG. 6 is an end elevational view of the friction drag spring means of FIG. 1.
Figure 7:
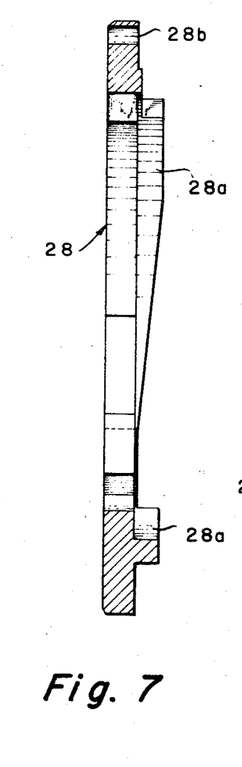
FIGS. 7 and 8 are longitudinal sectional and end elevation views, respectively, of the shift control cam means of FIG. 1.
Figure 8:
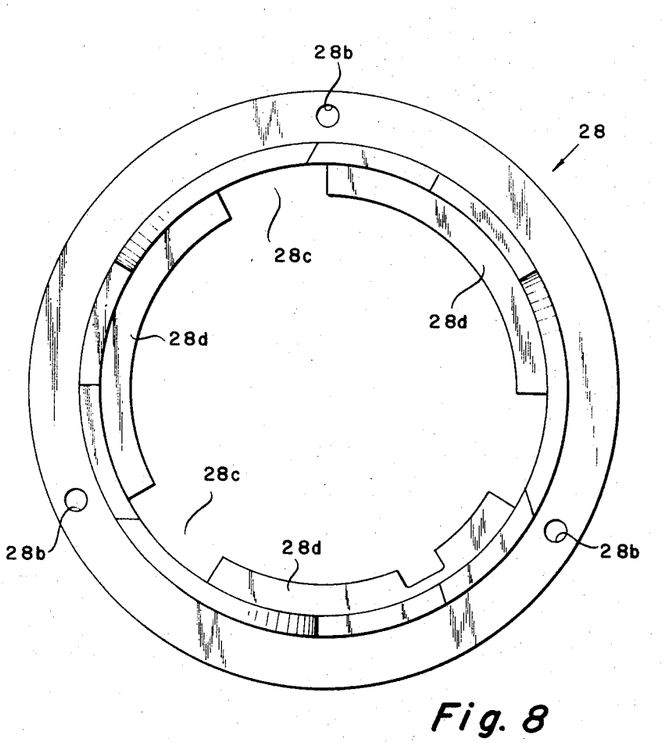
Figure 9:
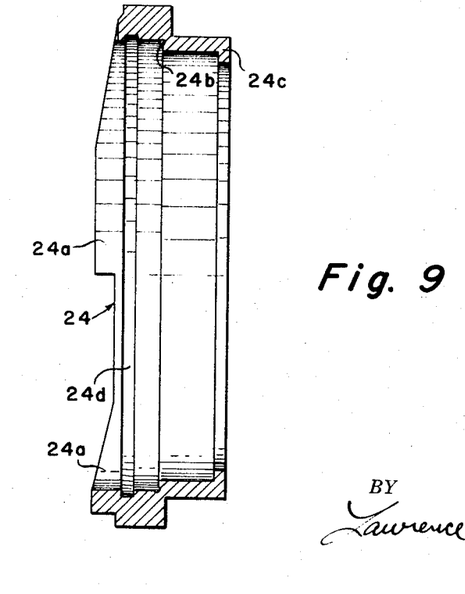
FIG. 9 is a longitudinal sectional view of the shift control member of FIG. 1.

Referring now to FIG. 2, the cylindrical spacer member 14 is provided on its inner periphery with spline teeth 14a, said member containing on its outer periphery a groove 14b that partially receives the friction drag spring 18, which spring is of a generally hexagonal configuration as shown in FIG. 6. The clutch members that abut the ends of the spacer member are similarly splined to the output shaft 2. Referring to FIG. 3, the forward clutch 12 is provided at one end with clutch teeth 12a for engagement with corresponding clutch teeth on the central driver member 16, and on its inner periphery with spline teeth 12b. Reverse clutch member 10 is similarly provided with corresponding clutch and spline teeth. As shown in FIG. 4, the clutch teeth are of the overrunning self-disengaging type, as is known in the art.

Figure 5:
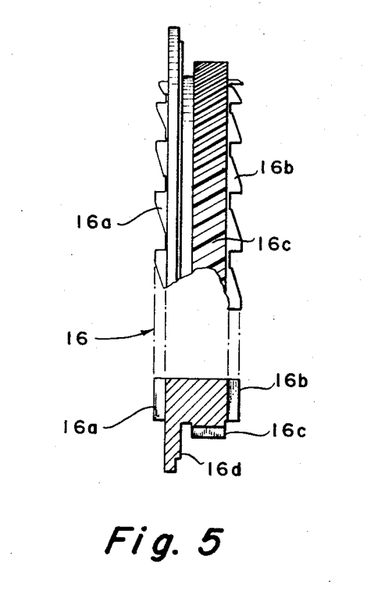
FIG. 5 is a partially sectioned side elevation view of the central driver member of FIG. 1.

Referring to FIG. 5, the central driver member 16 is provided at opposite ends with the clutch teeth 16a, 16b that correspond with the overrunning self-disengaging clutch teeth carried by the clutch members 10 and 12, respectively. At one end on its external periphery the central driver is provided with helical spline teeth 16c having a helix angle of 30° for engaging corresponding helical spine teeth carried on the inner periphery of the hub 20. At its other end, the external periphery of the central driver is provided with the radially extending flange 16d.

Figure 10:
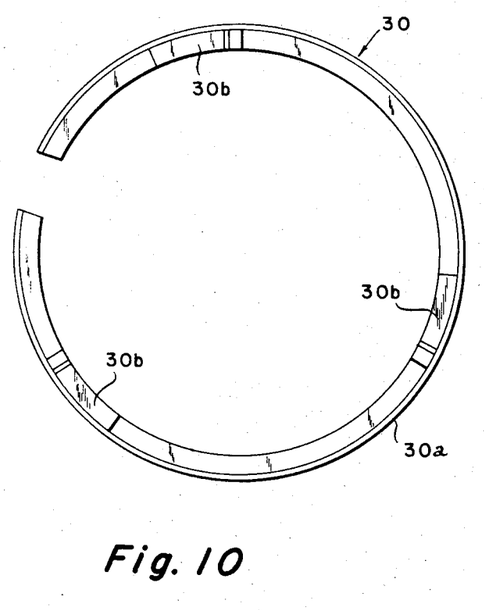
FIGS. 10–12 are end elevation, longitudinal sectional and detailed views, respectively, of the holdout ring means of FIG. 1.
Figure 11:
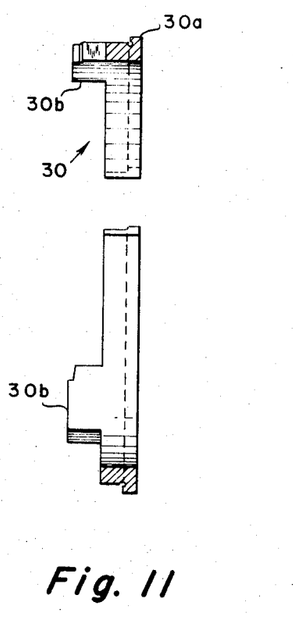
Figure 12:
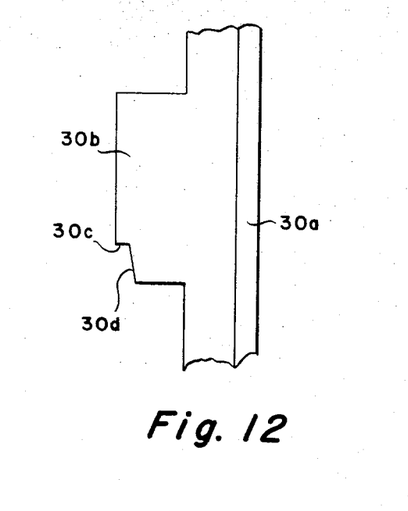
Figure 14:
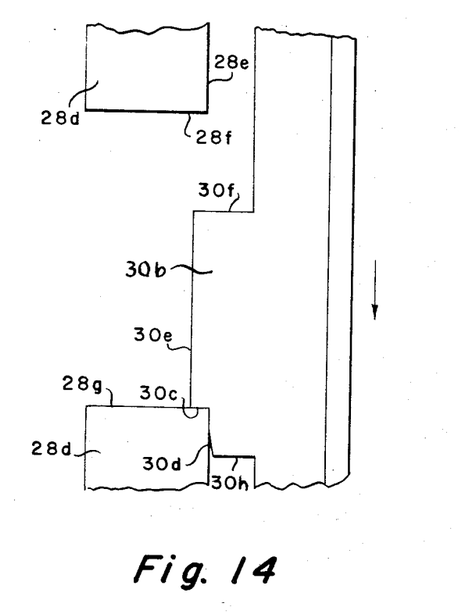
FIGS. 14 and 15 are diagrammatic views illustrating the operation of the holdout ring means for placing the shift control member in the first and second enabled positions, respectively.
Figure 15:
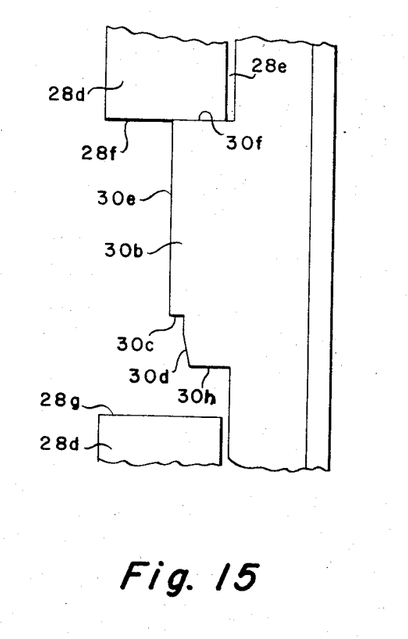

Referring now to FIGS. 7-12, the automatic shift control means includes a shift control cam member 28 having at its right hand end a series of circularly arranged clutch teeth 28a of the reversible overrunning type. At its outer periphery, the cam member contains a plurality of circumferentially arranged bores 28b by means of which the cam member is rigidly fastened with the housing. On its inner, periphery, the cam member contains a plurality of spaced radial slots 28c that define an equal number of radially inwardly projecting stops 28d. The annular shift control member 24, which is continuously biased to the left by compression spring 26, includes at its left hand end reversible overrunning clutch teeth 24a that correspond with the clutch teeth 28a. The left hand end of the shift control member is counterbored to define a stop shoulder 24b that is adapted for engagement by the external flange portion 16d of the central driver. At its right hand end, the shift control member includes a radially inwardly directed flange portion 24c that is arranged for sliding engagement with the outer periphery of the driving hub 20. Intermediate the plane containing the clutch teeth 24a and the stop shoulder 24b, the shift control member includes on its inner periphery the continuous circular groove 24d that receives the external flange 30a on the outer periphery of the holdout ring 30. Referring to FIGS. 10-12, the holdout ring 30 comprises a resilient split ring that is radially expandable into frictional engagement with the inner periphery of the left hand end of the shift control member. At its left hand end, the holdout ring includes a plurality of equally spaced axial projections 30b that are adapted for indexed cooperation with the radial slots 28c contained at the inner periphery of the shift control cam member 28. As shown in FIGS. 12, 14 and 15, the corresponding leading corner of each axial projection 30b of the holdout ring contains a notch that defines a pair of orthogonally arranged shoulder and end surfaces 30c and 30d, respectively.

OPERATION

In operation, assume that the vehicle is driven in the forward direction, and that the forward axle overruns the rear axle by the desired slight amount (on the order of 3 to 6 percent). Central drive member 16, which is placed in the disengaged condition by the overrunning clutch teeth, is now driven in an idle condition by the pinion 6 and input hub 20 via spline teeth 20a and 16c. Shift control member 24 is driven by input hub 20 via friction drag spring 34 and owing to the self-disengaging operation of the shift control cam teeth 24a, 28a, shift control member 24 and holdout ring 30 are shifted to the right against the restoring force of compression spring 26 toward the first enabling position. During this right hand movement of the shift control member, flange 16d of the central driver member 16 is engaged by the adjacent end surface of holdout ring 30, whereby the central driver is shifted slightly to the right toward a retracted readiness position relative to the forward clutch member 12. When the shift control member 24 is shifted to the position at which shoulder surface 30h of the holdout ring clears the corresponding stop surface 28g on the radial cam projections 28d, the holdout ring is rotated through a slight angle to cause end and stop surfaces 30d and 30c to engage corresponding surfaces 28e and 28g, respectively, on the radial projections 28d of the shift control cam member, as shown in FIG. 14. Holdout ring 30 now maintains the rotatably driven shift control member 24 in the first enabled position—and central driver 16 in the first readiness position—relative to the forward clutch member 12.

In the event that the rear wheels of the vehicle momentarily lose traction, a thrust is imparted to the driving member that is transmitted to the central driver 16 via the helical spline teeth 20a, 16c, whereupon the central driver is shifted to the right relative to shift control member 24 into clutching engagement with forward clutch member 12 to transmit driving torque to the front axle via output shaft 2. When the rear wheels resume traction and the front axle resumes its normal overrunning operation relative to the rear axle, the overrunning clutch teeth 12a, 16b shift central drive member 16 to the left relative to shift control member 24 toward the disengaged first readiness position relative to forward clutch member 12.

Assume now that the vehicle is driven in the reverse direction, thereby driving in the opposite direction the pinion 6, input hub 20, and shift control member 24. Holdout ring 30 is rotated through a slight angle to release recess end surface 30d from the corresponding end surface 28e of cam stop projection 28d, whereupon when the shoulder surface 30h clears the corresponding surface 28g of radial projection 28d, the biasing force of spring 26 and the engagement of cam teeth 28a and 24a cause shift control member 24 and holdout ring 30 to be shifted axially to the left toward the second enabling position. During this left hand movement, flange 16d is engaged by shoulder surface 24b to displace central driver 16 to the left toward a retracted second readiness position relative to the reverse clutch member 10, and owing to the frictional resistance between the holdout ring 30 and the shift control member, the holdout ring is rotated slightly to cause engagement between holdout ring surface 30f and radial projection surface 28f, as illustrated in FIG. 15.

In the event that the rear wheels lose traction, a thrust is imparted to central driver 16 via spline teeth 20a, 16c that shifts the central driver 16 to the left into clutching engagement with reverse clutch member 10. The front axle is now driven via the output shaft 2. When the rear wheels resume traction and the front wheels again resume the desired slight overrun, the overrunning clutch teeth 16a, 10a shift central driver 16 to the right relative to control shift member 24 toward the second readiness position relative to the reverse clutch member 10.

SECOND EMBODIMENT

Referring now to FIGS. 16-21, a second embodiment is disclosed that is adapted for use externally of the transfer case housing, like reference numerals being used on components that correspond with similar components of the first embodiment. The colinearly arranged output and input shafts 102 and 106 are journalled in front axle disconnect housing 104 by bearings 108 and 140, respectively, said shafts being adapted for connection with the front and rear axles of the vehicle, respectively. Keyed to the input shaft by teeth 120b is the input driving hub 120 having at one end an annular portion that extends concentrically about the reversible overrunning clutch means, said annular portion including on its inner periphery circumferentially arranged helical spline teeth 120a that engage corresponding helical spline teeth 116c carried by the outer periphery of the central driver. In this embodiment the spline teeth 120a, 116c have a helix angle of 15°.

Figure 16:
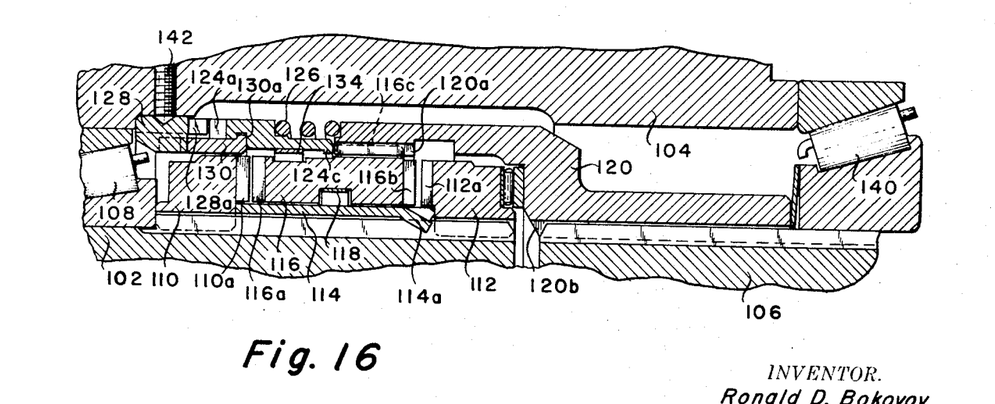
FIG. 16 is a detailed sectional view of a second embodiment of the reversible overrunning clutch means.
Figures 19, 20:
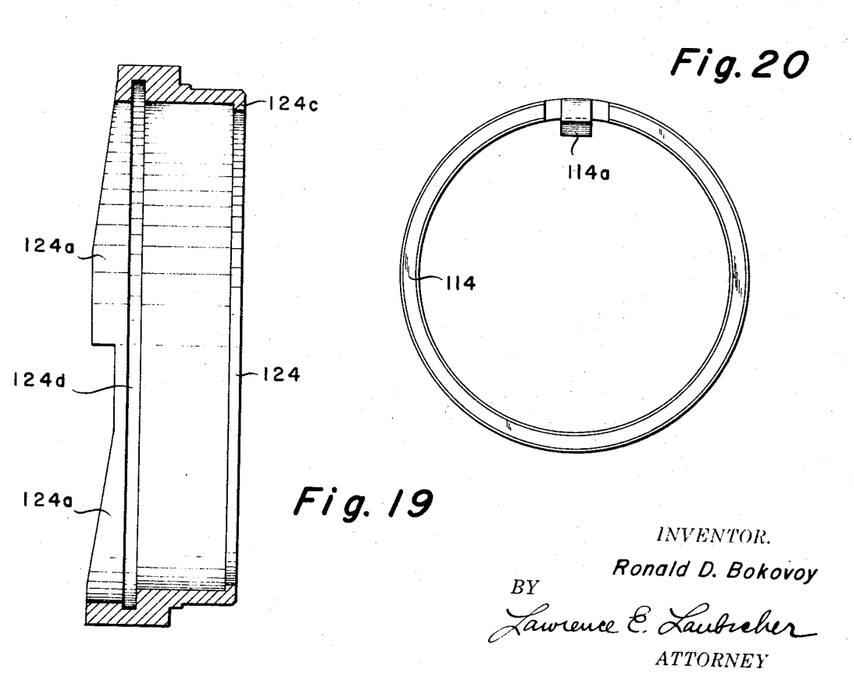
FIG. 19 is a longitudinal sectional view of the shift control member of FIG. 16.
FIG. 20 is a longitudinal sectional view of the spacer member of FIG. 16.
Figure 21:
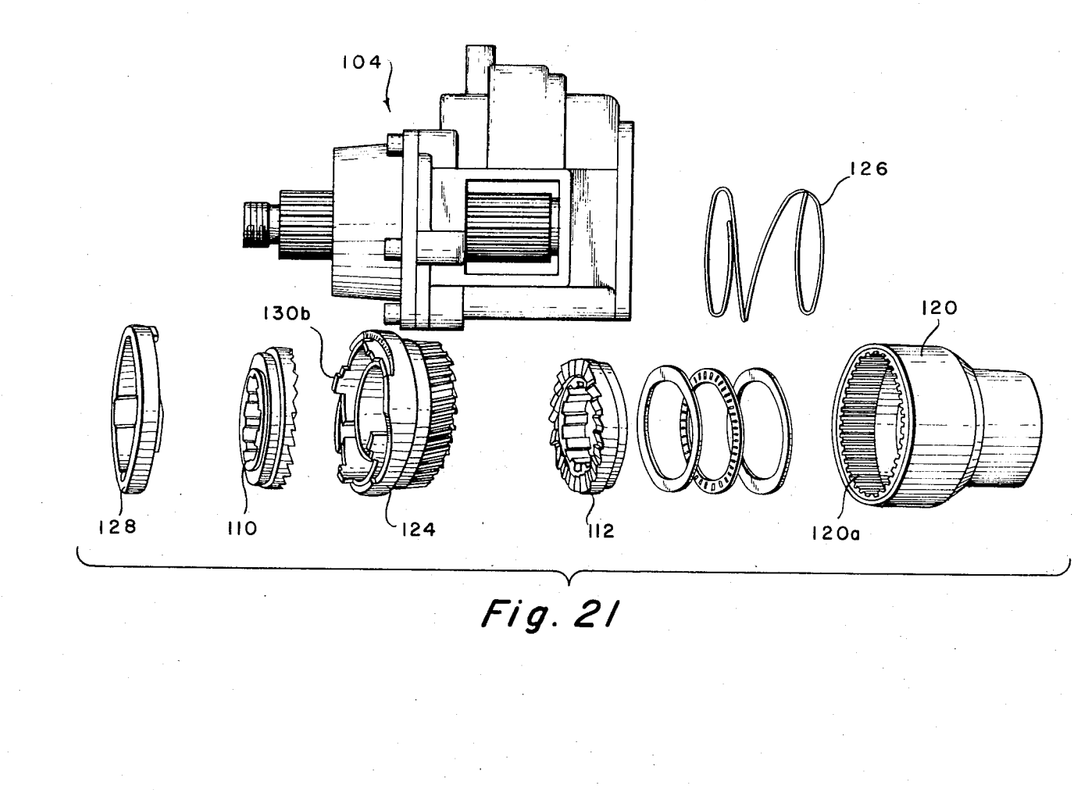
FIG. 21 is an exploded view of the apparatus of FIG. 16.

The reversible overrunning clutch means of FIG. 16 are similar to those of FIG. 1, one difference residing in the structure of the spacer member 114 that is arranged between the reverse and forward clutch members 110 and 112, respectively. As shown in FIGS. 16 and 20, the tubular spacer member 114 has smooth inner and outer peripheral surfaces, said spacer member being provided at one end with a deformed tongue portion 114a that extends between the spline teeth on the output shaft 102.

Figures 17, 18:
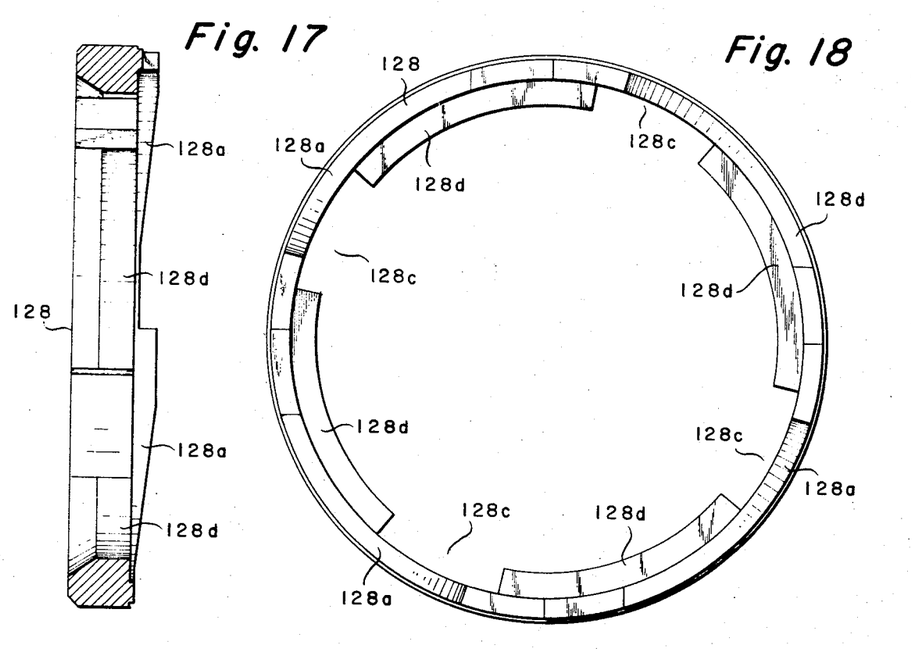
FIGS. 17 and 18 are longitudinal and end elevation views respectively, of the shift control cam means of FIG. 16.

The automatic shift control means for axially displacing the central driver 116 toward the readiness positions adjacent the forward and reverse clutch members, respectively, includes a stationary shift control cam member 128 that is rigidly connected with the housing 104 by set screw means 142. As shown in FIGS. 17 and 18, the cam member is provided at its right hand end with a circular series of overrunning self-disengaging cam teeth 128a that engage corresponding cam teeth 124a on the shift control member 124 (FIGS. 16 and 19). As shown in FIG. 18, the cam member is provided on its inner periphery with a plurality of spaced slots 128c that define radially inwardly extending projections 128d in indexed relation relative to the corresponding axial projections 130b on the holdout ring 130. At its right hand end, the shift control member 124 has a radially inwardly directed flange portion 124c adapted to abut the adjacent ends of the helical spline teeth 116c on the central driver 116, said shaft control member containing on its inner periphery the groove 124d for rotatably receiving the external flange 130 a of the holdout ring 130. Friction drag spring 118 frictionally resists axial displacement of central drive member 116 relative to spacer member 114, and friction drag spring 134 frictionally resists axial displacement of shift control member 124 relative to central driver 116.

The operation of the embodiment of FIG. 15 is substantially identical to that of the embodiment of FIG. 1. As long as the driving member 120 is driven by input shaft 106 in the forward direction and the front axle overruns the rear axle by the desired slight amount, the central driver member 116 is placed in the illustrated disengaged condition by the overrunning self-disengaging operation of the clutch teeth. Owing to the cooperation between cam teeth 128a and 124a, shift control member 124 is axially shifted to the right against the restoring force of spring 126 toward a first enabling position relative to forward clutch 112. During this right hand movement of the shift control member, the flange portion 124c thereof engages the helical spline teeth 116 on the central driver, thereby axially shifting the central driver toward a first readiness position relative to the forward clutch 112. The holdout ring 130 operates in the manner illustrated in FIG. 14 to maintain the shift control sleeve 124 and the central driver member 116 in the first enabled and first readiness positions, respectively.

In the event that the rear wheels momentarily lose traction, central driver 116 is shifted to the right—owing to the thrust imparted thereto by the helical spline teeth 120a and 116c—to effect driving engagement between clutch teeth 116b and 112a, whereby output shaft 102 will transmit driving torque to the front wheels of the vehicle. When the rear wheels resume traction, the central driver is shifted to the left by the self-disengaging clutch teeth, whereby the front wheels again overrun the rear wheels by the desired slight amount.

When the direction of rotation of input shaft 106 and hub 120 is reversed, the holdout ring is angularly rotated to the released position (corresponding to FIG. 15) relative to the radial projections on shift control cam member 128, whereupon owing to the resilient biasing force of spring 126 and the camming action of cam teeth 124a, 128a, shift control member 124 is shifted to the left to a second enabled position relative to the reverse clutch member 110. During this left hand movement of the shift control member, friction drag spring 134, which has a configuration similar to that of FIG. 5, is engaged by shoulder 124c, whereby the central driver 116 is shifted to the left to a readiness position relative to the reverse clutch member. Upon loss of traction by the rear wheels, central driver is shifted by spline teeth 116c, 120a into clutching engagement with the reverse clutch member. When the rear wheels require traction, the self-disengaging clutch teeth return the central drive to the disengaged position of FIG. 16.

While in accordance with the Patent Statutes the preferred forms and embodiments have been illustrated and described, it will be apparent to those skilled in the art that various changes and modifications may be made in the apparatus described without deviating from the inventive concept.

What is claimed is:

1. Reversible overrunning clutch means for driving the overrunning front axle of a motor vehicle when the rotational speed thereof fails to exceed a rear axle speed by a predetermined slight amount, comprising
   a. a housing;
   b. an output shaft journalled in said housing, said output shaft being adapted for connection with the vehicle front axle;
   c. a rotary input driving member arranged for rotation adjacent said output shaft, said driving member being adapted for connection with the vehicle rear axle;
   d. reversible overrunning clutch means operable to connect said driving means with said output shaft, including
      1. forward and reverse annular clutch members secured to said output shaft in axially spaced relation;
      2. an annular central driver member slidably mounted on said output shaft between and spaced from said annular clutch members, said central driver member having at opposite ends clutch teeth of the self-disengaging overrunning type adapted to engage corresponding clutch teeth on said annular clutch members, respectively; and 3. direction-responsive operating means connected between said driving means and said central driver member for axially shifting said central driver member in a direction corresponding with the direction of rotation of said driving means; and e. automatic shift control means responsive to the direction of rotation of said driving means for positioning said central driver member in a readiness position immediately adjacent the corresponding one of said annular clutch members to insure the correct directional operation of said clutch means.

2. Reversible overrunning clutch means as defined in claim 1, wherein said shift control means comprises a. an annular shift control member arranged concentrically at one end about one end of said central driver member for axial displacement relative to said output shaft;

b. stationary annular shift control cam means connected with said housing colinear with and adjacent the other end of said shift control member, said shift control member and said shift control cam means having at adjacent ends cooperating cam teeth of the self-disengaging overrunning type;

c. resilient means biasing said shift control member axially in the direction of said shift control cam means;

d. means connecting said central driver member for limited axial movement relative to said shift control member; and e. holdout ring means connected between said shift control cam means and said shift control member, said holdout ring means being operable, when said input driving means is rotated in a direction causing said cam means to axially displace said shift control member in one direction toward a first enabling position relative to one of said clutch members, to retain said shift control member in said first enabling position.

3. Apparatus as defined in claim 2, wherein said holdout ring means is operable upon rotation of said input driving member in the opposite direction to release said shift control member, said shift control member being shiftable in the opposite axial direction by said resilient means and by the engagement of said cam teeth toward a second enabling position relative to the other clutch member.

4. Apparatus as defined in claim 3, and further including friction drag spring means resisting axial displacement of said central driver member relative to said output shaft, thereby assuring that during axial displacement of said central driver member toward either of said enabling positions, said central driver member is shifted to a retracted position relative to said shift control member, whereby when said shift control member is in an enabling position, said central driver is in a readiness position relative to the corresponding clutch member.

5. Apparatus as defined in claim 1, wherein said input driving member comprises an annular hub member arranged concentrically at one end around one end of said central driver member, and further wherein said direction-responsive operating means comprises cooperating helical spline teeth arranged on the outer and inner peripheries of said central driver member and said annular hub member, respectively.

6. Apparatus as defined in claim 5, and further including a driving pinion rotatably mounted on said output shaft, said driving pinion being rigidly connected with the other end of said annular hub.

7. Apparatus as defined in claim 5, and further including an input shaft rotatably connected with said housing, said input shaft being colinear with said output shaft, said hub member being rigidly connected at its other end with said input shaft.

8. Apparatus as defined in claim 2, wherein said holdout ring means is arranged concentrically within said shift control cam means and said shift control member.

* * * * *